Nov. 2, 1948.        R. L. WRIGHT, II        2,452,823
                       CABLE SPLICE
Filed Sept. 18, 1943                    2 Sheets-Sheet 1

INVENTOR.
R. L. WRIGHT II
BY
ATTORNEY

Nov. 2, 1948.  R. L. WRIGHT, II  2,452,823
CABLE SPLICE

Filed Sept. 18, 1943  2 Sheets-Sheet 2

INVENTOR.
R. L. WRIGHT II
BY
ATTORNEY

Patented Nov. 2, 1948

2,452,823

UNITED STATES PATENT OFFICE 2,452,823

CABLE SPLICE

Robert L. Wright, II, Dundalk, Md., assignor to Western Electric Company, Incorporated, New York, N. Y., a corporation of New York Application September 18, 1943, Serial No. 502,964

1 Claim. (Cl. 174—84)

This invention relates to cable splices, and has for its object the provision of new and improved cable splices.

One method of making a cable splice embodying the invention comprises inserting ends of conductors to be joined into a flexible metal splicing tube which engages the conductors tightly enough to maintain electrical contact therewith, but at the same time permits the conductors to slide therein.

A complete understanding of the invention may be obtained from the following detailed description, taken in conjunction with the accompanying drawings, in which Fig. 1 is a plan view of a partially completed splice made in accordance with the invention;

Figure 1:
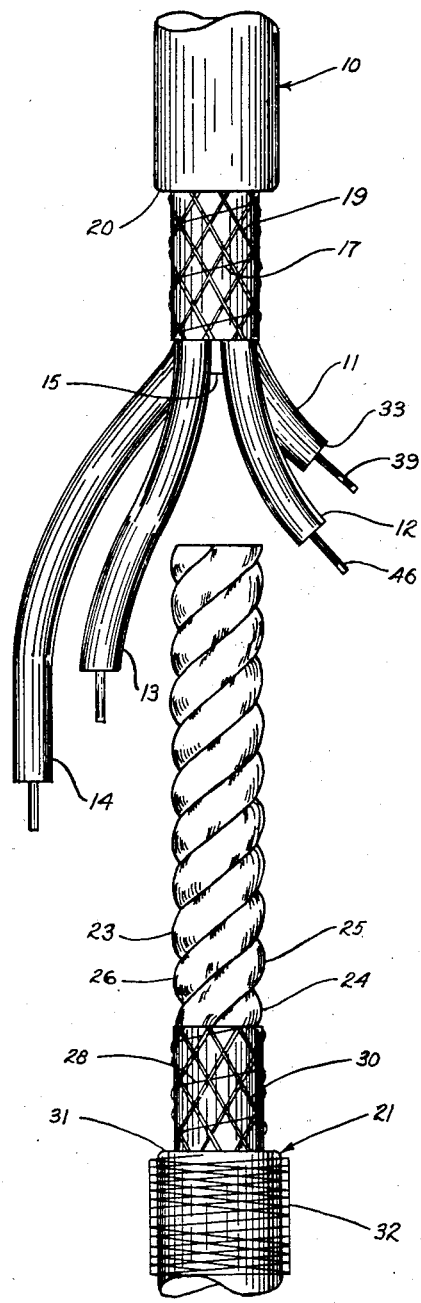

Referring to the drawings, a cable 10 of the type to be spliced consists of individually insulated conductors 11, 12, 13 and 14 wrapped around a filler 15 of a suitable non-conducting material and around which conductors a tape 17 is wrapped to form a sheath for the conductors. The wires forming the conducting cores of the insulated conductors may be either solid or stranded. Over the tape 17 a wire braid 19 is formed to give the cable 10 mechanical strength. A jacket 20 of a tough, waterproofing material, such as a rubber compound, is formed over the braid 19 to complete the cable.

A cable 21, which is identical with the cable 10, includes a plurality of individually insulated conductors 23, 24, 25 and 26 (Fig. 1) twisted around a filler 27 like the filler 15 and covered with a tape 28, which is enclosed by a wire braid 30 and a waterproofing jacket 31.

In the splicing operation, a loosely braided metal sleeve 32 is slipped over the cable 21 (Fig. 1) and portions of the jackets 20 and 31 are removed from the cables 10 and 21 to bare the interior portions of the cables. The braids 19 and 30 are severed at points near the ends of the jackets (Fig. 1) and the severed portions thereof are removed. End portions of the tapes 17 and 28 are severed at points slightly beyond the ends of the wire braids and are removed from the conductors therebeneath.

Figure 2:
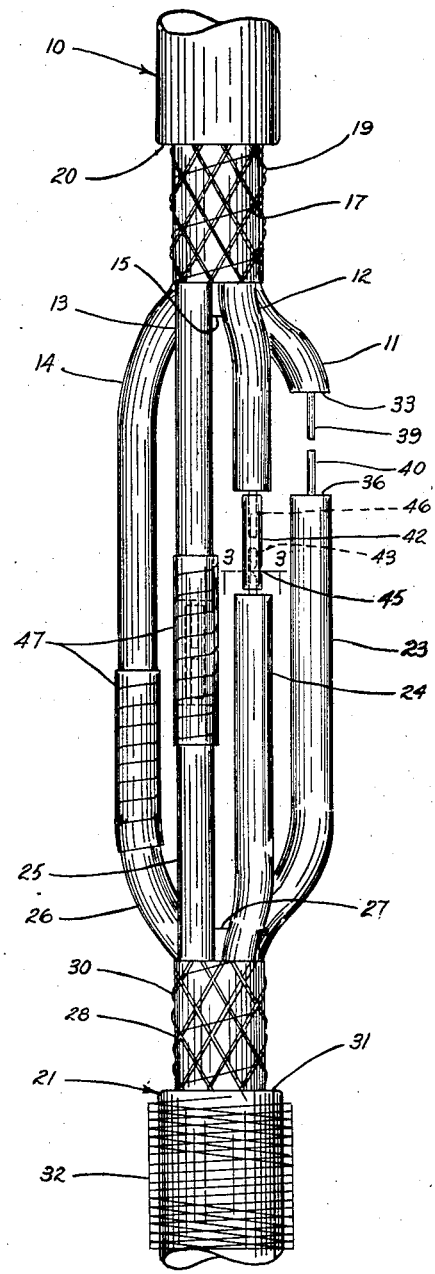
Fig. 2 is a plan view of a partially completed splice during another stage of completion thereof.

The bared ends of the insulated conductors of the cables 10 and 21 are untwisted (Fig. 1), and the fillers 15 and 27, uncovered by the untwisting, are severed. The conductors 11 and 23 are severed at points so separated that when the ends thereof just touch, a splice of the desired length will result (Figs. 1 and 2). The insulations then are removed from the ends of the conductors to bare the ends of the core wires, as illustrated by ends of insulations 33 and 36 removed to bare the ends of wires 39 and 40 of the insulated conductors 11 and 23. This operation is repeated with each pair of the insulated conductors of the cables 10 and 21, but each pair is severed and freed of insulation at a different point along the cables so that the resulting joints will be staggered.

A flexible splicing tube made of electroconductive material, such as copper, is placed over the end of each of the bared wires of the cable 21, as illustrated by a tube 42 slid over bared wire 43 of the conductor 24. Each splicing tube is fastened to its respective wire in a manner illustrated by the tube 42 fastened to the wire 43 by a crimp 45 (Figs. 2 and 3) to prevent the wire 43 from sliding within the tube. Each of the bared wires of the cable 10 is then slid into the other end of one of the splicing tubes, as illustrated by a wire 46 positioned in the tube 42. Each splicing tube containing the ends of the two wires and the adjoining bare portions of the wires is then wrapped with an elastic insulating tape, as shown by tapes 47—47, to completely insulate them.

The splicing tubes are just large enough to permit the wires of the cable 10 to slide freely therein, but are small enough to tightly contact the wires positioned therein to provide good electrical connections therebetween. The splicing tubes are somewhat flexible and splices made therewith have sufficient flexibility for satisfactory service.

Figures 3, 4:
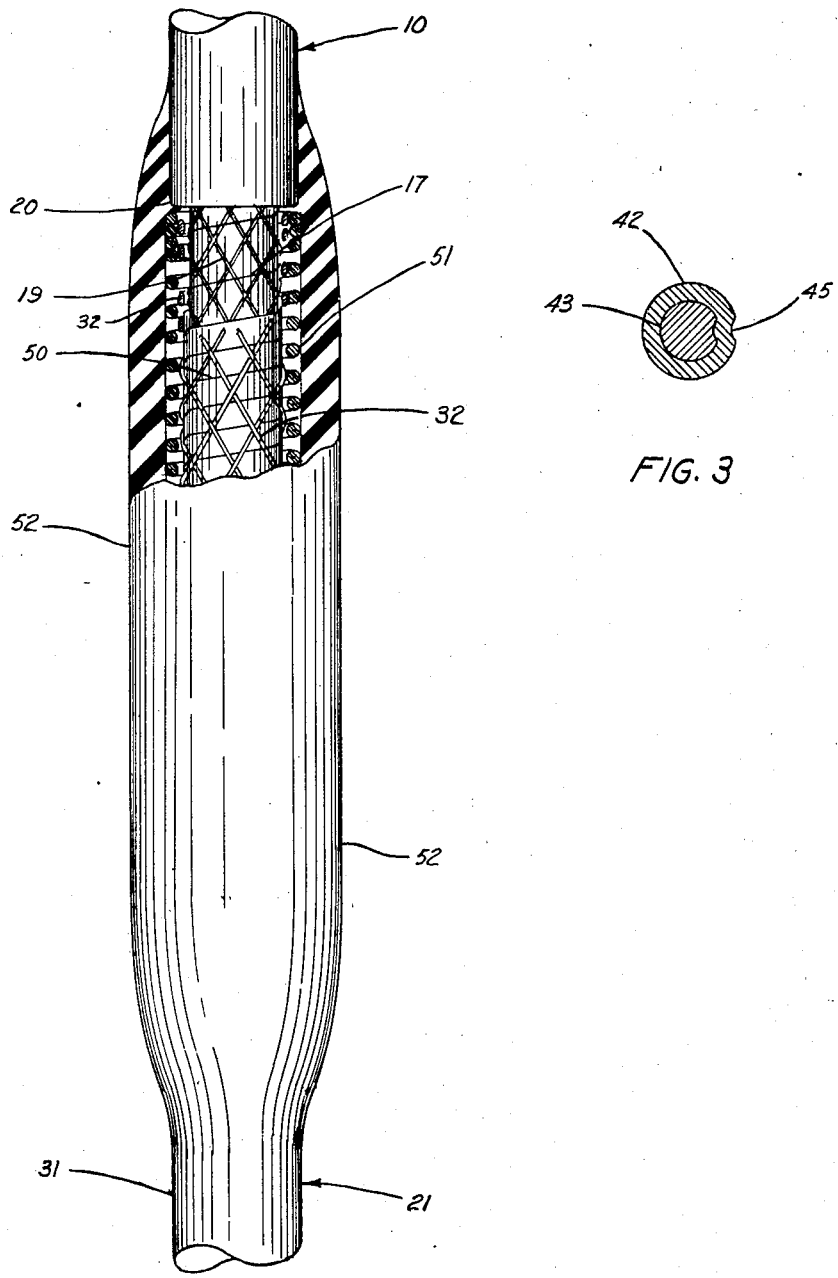
Fig. 3 is an enlarged, fragmentary, sectional view taken along the line 3—3 in Fig. 2.
Fig. 4 is a plan view in partial section showing the completed splice.

The cables are twisted in opposite directions to retwist the spliced conductors and a tape 50 is wrapped over the twisted conductors therebetween, so as to overlap the ends of the tapes 17 and 28, as illustrated in Fig. 4. The braided wire sleeve 32 is drawn over the spliced portions of the cables 10 and 21. The sleeve 32 is then extended longitudinally to cause it to engage the splice, and it is then lashed firmly in place with a lashing wire 51. The sleeve 32 is securely lashed to portions of the wire braids 19 and 30 and connects them mechanically.

The entire splice is then surrounded with a mass of unvulcanized, vulcanizable material 52, such as a rubber compound, and the splice is placed in a vulcanizing press wherein the vulcanizable material is vulcanized and the splice completely protected.

When the spliced cable is subjected to tension, the braided sleeve 32 and the wire braids 19 and 30 connected thereto will bear the strain. If the splice elongates under tension, the conductors in the tubes may slide therein. Consequently, the conductors will have no tension thereon which would be likely to break the splices, although the splicing tubes maintain good electrical connections therewith during movement of the conductors. Splices made in accordance with the methods herein described are very strong and are not likely to break under excessive tension and thus are highly practicable. Obviously, cables having more or less than four conductors may be spliced in a manner similar to that described above.

What is claimed is:

A spliced cable, which comprises two lengths of flexible cable, each of said lengths of flexible cable including a plurality of individually insulated conductors of which one end of each is bare and a braided, tension-bearing, metallic sheath enclosing the insulated conductors, a plurality of electro-conductive tubes, each of said tubes being crimped on the bared end of one of the insulated conductors of one of the lengths of cable and closely but slidably engaging the bared end of an insulated conductor of the other length of cable to electrically connect the respective conductors, a plurality of masses of insulating material serving to enclose the respective tubes to insulate them from one another, and a braided, tension-bearing, metallic sheath enclosing the insulated tubes and mechanically connecting the tension-bearing sheaths of the lengths of cable.

ROBERT L. WRIGHT, II.

REFERENCES CITED

The following references are of record in the file of this patent:

UNITED STATES PATENTS

| Number | Name | Date |
|---|---|---|
| 378,021 | Silliman | Feb. 14, 1888 |
| 686,832 | Peachey | Nov. 19, 1901 |
| 1,241,809 | Beardsley | Oct. 2, 1917 |
| 1,272,700 | Newcomb | July 16, 1918 |
| 1,443,613 | Beaver et al. | Jan. 30, 1923 |
| 2,044,580 | Leach | June 16, 1936 |
| 2,181,860 | Adkinson | Dec. 5, 1939 |
| 2,183,945 | Schreiner | Dec. 19, 1939 |
| 2,253,435 | Lang | Aug. 19, 1941 |
| 2,287,163 | Bishop | June 23, 1942 |
| 2,332,952 | Tischer et al. | Oct. 26, 1943 |

FOREIGN PATENTS

| Number | Country | Date |
|---|---|---|
| 17,974 | Great Britain | Nov. 9, 1905 |
| 105,742 | Austria | 1927 |
| 381,366 | Great Britain | Oct. 6, 1932 |
| 410,213 | Great Britain | 1934 |
| 429,611 | Great Britain | June 4, 1935 |